US 008850358 B2

(12) United States Patent
Lecomte et al.

(10) Patent No.: US 8,850,358 B2
(45) Date of Patent: Sep. 30, 2014

(54) SYSTEM AND METHOD FOR KEYBOARD NAVIGATION IN A SEARCH RESULTS PAGE

(75) Inventors: Julien Lecomte, Milpitas, CA (US); Liang-Yu Chi, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 771 days.

(21) Appl. No.: 11/863,427

(22) Filed: Sep. 28, 2007

(65) Prior Publication Data
US 2009/0089415 A1   Apr. 2, 2009

(51) Int. Cl.
*G06F 3/048* (2013.01)
*G06F 17/30* (2006.01)

(52) U.S. Cl.
CPC .................... *G06F 17/30861* (2013.01)
USPC ........... 715/827; 715/200; 715/700; 715/867; 707/706; 707/736; 707/758; 709/223

(58) Field of Classification Search
USPC .......................................... 709/224; 715/854
See application file for complete search history.

(56) References Cited

U.S. PATENT DOCUMENTS

| | | | |
|---|---|---|---|
| 6,724,399 B1* | 4/2004 | Katchour et al. | 715/740 |
| 7,552,400 B1* | 6/2009 | Sriver et al. | 715/827 |
| 2002/0070924 A1* | 6/2002 | Petersen | 345/172 |
| 2002/0070962 A1* | 6/2002 | Van Doorselaer et al. | 345/738 |
| 2003/0004638 A1* | 1/2003 | Villers et al. | 701/211 |
| 2003/0208472 A1* | 11/2003 | Pham | 707/2 |
| 2004/0075696 A1* | 4/2004 | Koch et al. | 345/827 |
| 2004/0104944 A1* | 6/2004 | Koay et al. | 345/827 |
| 2004/0141012 A1* | 7/2004 | Tootill | 345/827 |
| 2004/0189717 A1* | 9/2004 | Conally et al. | 345/853 |
| 2005/0132297 A1* | 6/2005 | Milic-Frayling et al. | 715/745 |
| 2005/0192946 A1* | 9/2005 | Lu et al. | 707/3 |
| 2007/0067741 A1* | 3/2007 | Spisak | 715/827 |
| 2007/0180407 A1* | 8/2007 | Vahtola | 715/847 |
| 2008/0235789 A1* | 9/2008 | Erwin et al. | 726/19 |
| 2008/0320050 A1* | 12/2008 | Chan | 707/200 |

* cited by examiner

*Primary Examiner* — Hung Le
(74) *Attorney, Agent, or Firm* — Pillsbury Winthrop Shaw Pittman LLP

(57) ABSTRACT

The present invention is directed towards systems, methods and computer program products for providing keyboard navigation between components within a content item. The method of the present invention comprises receiving the content item from a server and receiving a signal indicating keyboard utilization by the user to determine a specific key that the user presses. A determination is made as to whether the specific key is from a monitored set of keys and if the specific key is from a monitored set of keys, performing an action associated with the specific key.

17 Claims, 4 Drawing Sheets

SYSTEM AND METHOD FOR KEYBOARD NAVIGATION IN A SEARCH RESULTS PAGE

CROSS REFERENCE TO RELATED APPLICATIONS

This application is related to the following pending applications, which are hereby incorporated herein by reference in their entirety:
U.S. patent application Ser. No. 11/863,431, entitled "SYSTEM AND METHOD FOR DRILL-DOWN SEARCH RESULTS," filed Sep. 28, 2007; and
U.S. patent application Ser. No. 11/863,435, entitled "SYSTEM AND METHOD FOR NON-LETTER KEY FUNCTIONALITY IN A SEARCH CONTROL," filed Sep. 28, 2007.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The invention disclosed herein relates generally to keyboard navigation within an Internet search engine. More specifically, the present invention is directed towards systems and methods for detecting user keyboard interaction with a content item, such as a search results page, and appropriately managing navigation events.

BACKGROUND OF THE INVENTION

As the number of content items available on the Internet increases, the demand on search engines is increasing accordingly. The billions of content items available to be served on the global network requires a novel solution to provide comprehensive indexing. In addition to providing comprehensive coverage of such a vast amount of data, search engines are tasked with the additional duty of providing functionality capable of capturing the interest of an Internet user to ensure repeated usage of the search engine.

Although there have been many improvements to search engines, the basic navigational aspects of Internet search engines have remained virtually unchanged since the introduction of the graphical web browser. Currently, major search engines require standard mouse interaction with search results pages, such as mouse scrolling and mouse clicks to select hyperlinks corresponding to search results. Furthermore, a search results page still remains a generally static element. A user is presented with an unchanging list of suggested matches with a title and a brief excerpt of the page, commonly referred to as an abstract. Although many browser applications allow for tab-based navigation of a web page, this navigation is severely limited, only allowing the user to sequentially traverse links in a content item and does not provide for or allow any customization.

There is thus a need in the art for a more dynamic presentation of search results to increase the speed at which a given user may utilize a given search engine, as well as to increase the accuracy of a user identification of relevant content items and thereby increase the return of users to the given search engine. The present invention proposes novel navigation solutions that utilize keyboard interaction to navigate a search results page or other content item.

SUMMARY OF THE INVENTION

The present invention is directed towards systems and methods for detecting keyboard interaction within a search results page. The method of the present invention comprises receiving content from a server, exemplary content being a search results page comprising a plurality of items such as hyperlinks, search control elements and executable program code.

A search results page may be operative to monitor user interaction with the received content item. In one embodiment, the content item may determine if a search control has received focus. For example, a determination of whether a search control has received focus may comprise executing scripting code in the content item at the client device that receives the content item, such as by executing JavaScript. The content item may then receive a signal indicating keyboard utilization by the user to determine a specific key that a user presses and determine if the specific key is from a monitored set of keys. In one embodiment, determining if the specific key is from a monitored set of keys may comprise comparing the specific key to an enumerated list of key press action associations, such as with an event handler, the event handler comprising executable scripting code resident within the content item. If the specific key is from a monitored set of keys, an action may be performed, the action being associated with a specific key.

In a preferred embodiment, performing an action associated with the specific key comprises switching a corpus upon which to execute a search. In one embodiment, switching the corpora comprises selecting one or more specialized corpora upon which to execute the search. In an alternative embodiment, the content item may re-execute the search using the corpus.

Alternatively, performing an action associated with the specific key comprises displaying an assistance surface, display the assistance surface comprising displaying information related to a query entered into the search control. The information related to a query may comprise one or more searches related to the query entered into the search control.

In an alternative embodiment, the performed action associated with a specific key may comprise moving a focus to a next link in the content item. In an alternative embodiment, the performed action associated with a specific key may comprise moving a focus to a previous link in the content item. In a third embodiment, the performed action associated with a specific key may comprise selecting a next link in the content item.

In a third alternative embodiment, a method of the present invention may comprise determining if a user has enabled additional page details. In a preferred embodiment, determining if a user has enabled additional page details may comprise a user selecting whether or not he or she wishes to view additional page details before navigating to a given content item. In a preferred embodiment, the selection may be stored within a user profile. In an alternative embodiment, the selection may be stored in a cookie on a device of the user.

In a third alternative embodiment, a determination may be made as to whether additional page details exist for the selected content item. If the additional page details exist, the additional page details may be displayed to the user. In a preferred embodiment, displaying the additional page details may comprise displaying in response to a user selection command, additionally, removing the additional page details may be in response to the user selection command.

In a preferred embodiment, displaying comprises displaying metadata associated with the content item. In an alternative embodiment, displaying comprises displaying page analytics associated with the content item. In one embodiment, page analytics may comprise displaying a thumbnail associated with the content item.

In addition to the previously described method, a computer readable media comprising program code for execution by a programmable processor that instructs a processor may be utilized to perform the above described method.

The present invention is further directed towards a system for detecting keyboard interaction with a search results page. A system of the present invention may comprise a search engine operative to provide a search result page comprising links to content items that are responsive to the search query.

In a first embodiment, a search engine may further be operable to provide a search control for placement in a content item, the search control operative to receive a search query from a user for use by the search engine to search a corpus of content items. The system may further comprise a navigation module operative to determine if a search control receives focus, determine a specific key that the user presses, determining if said specific key is from a monitored set of keys and if the specific key is from a monitored set of keys, performing an action associated with the specific key. In a preferred embodiment, the navigation module may be associated with the content item by way of a link between the navigation module and the content item.

In a second embodiment, a system may further comprise a navigation module operative to receive a signal indicating keyboard utilization by the user to determine a specific key that the user presses and determining if the specific key is from a monitored set of keys and if the specific key is from a monitored set of keys. In a preferred embodiment, the navigation module may comprise executable code resident in a search result page.

The navigation module may further be operative to perform an action associated with the specific key. In a preferred embodiment, the performing the action comprises moving a focus to a next link in the content item. In an alternative embodiment, performing the action comprises moving a focus to a previous link in the content item. In an alternative embodiment, performing the action comprises selecting a next link in the content item.

In a third embodiment, a system may further comprise a detail display module operative to determine if a user has enabled additional page details, determining if additional page details exist for the selected content item and if said additional page details exist, displaying said additional page details to said user. In a preferred embodiment, the detail display module may be operative to display and hide said additional page details in response to the detection of a predetermined user action.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
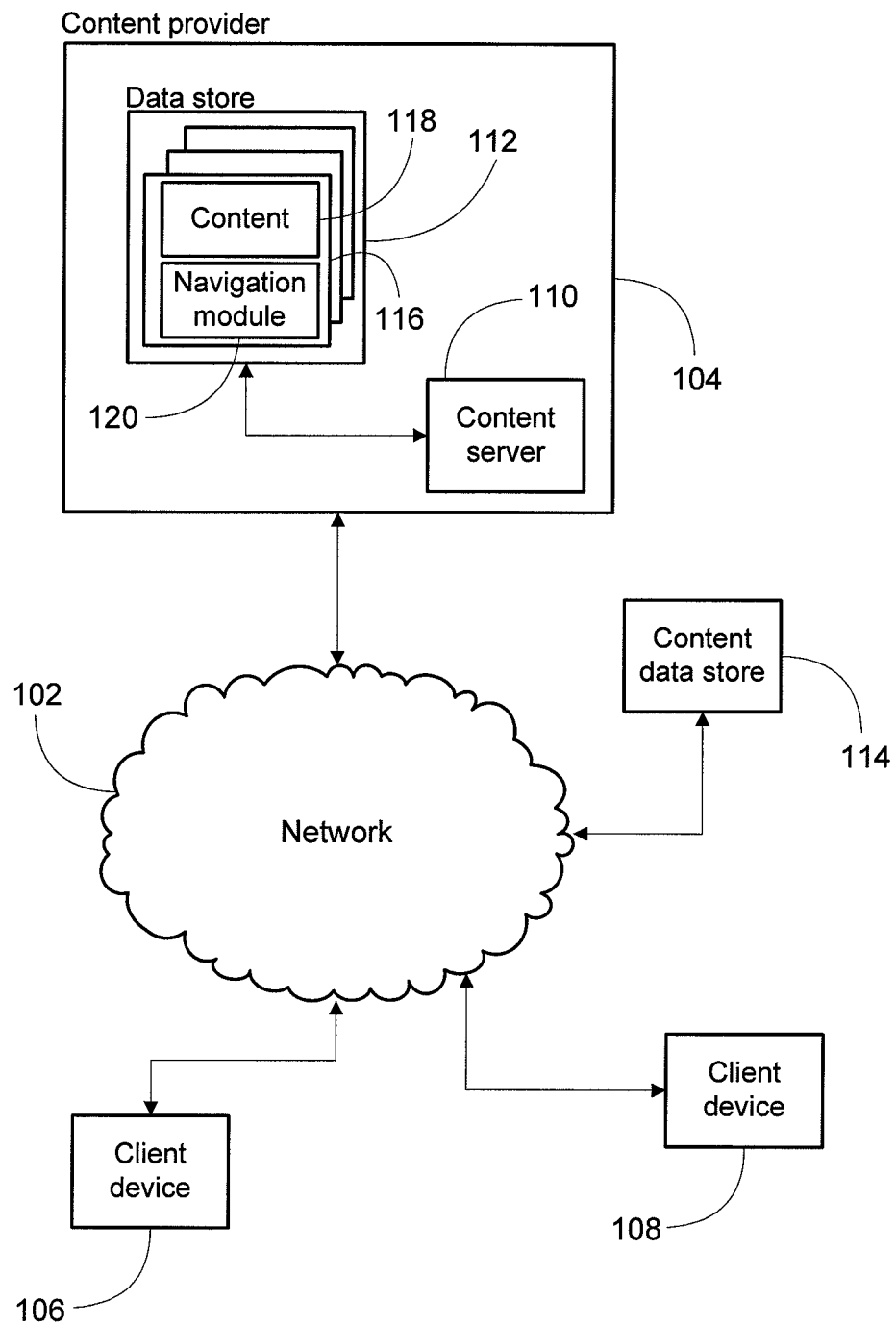
FIG. 1 presents a block diagram illustrating a system for keyboard navigation of content items according to one embodiment of the present invention.

FIG. 1 presents a block diagram depicting a system for focus indication according to one embodiment of the present invention. According to the embodiment illustrated in FIG. 1, one or more client devices 106 and 108 are communicatively coupled to a network 104, which may include a connection to one or more local and wide area networks, such as the Internet. According to one embodiment of the invention, a given client device 106 and 108 is general-purpose personal computer comprising a processor, transient and persistent storage devices, input/output subsystem and bus to provide a communications path between components comprising the general-purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

A given client device 106 and 108 may be in communication with a content provider 102 that hosts one or more content items. The content provider 102 may maintain one or more content servers 11, a given content server 110 hosting one or more web pages. The content provider 102 may also comprise a data store 112 for the storage and transmission of one or more content items 116 in response to a request from a client device 106 and 108. For example, the content provider 102 may comprise a web site that includes a content server 112 (e.g., Apache™, Internet Information Server™, etc.) and a data store 112, which according to one embodiment is a database that maintains web pages in an organized and structured manner. The content provider 102 may further maintain program code that, when executed by the content provider 102, is operative to dynamically generate one or more content items 116, such as where the content provider is a search engine that dynamically generates a search result page in response to the receipt of a search query from a client device 106 and 108.

As FIG. 1 illustrates, the data store 112 may contain one or more content items 116. In accordance with one embodiment, a given content item 116 may comprise a static or dynamically generated HTML page; the given content item 116 comprising both content 118 and a navigation module 120. According to one embodiment of the invention, the content 118 may be retrieved by the content server 110, which may comprise a search engine, in response to a user request for search results related to an entered term. Methods of retrieving search results based upon a user query are well known in the art and are not discussed at length herein.

Upon fetching content 118 related to a user search query, a navigation module 120 may be added to the content item 116 to enable keyboard navigation of the content 118. In accordance with one embodiment, navigation module 120 may comprise one or more items of JavaScript program code in files or libraries added to or included with a generated content item. The one or more items of JavaScript program code may be included as part of the content item 116. According to alternative embodiments, a reference to an external item of JavaScript program code may be inserted into the content item 116. After the content item 116 is formed from the content 118 and navigation module 118, the content item 116 may be transmitted across network 102 to a plurality of client devices 106 and 108.

Figure 2:
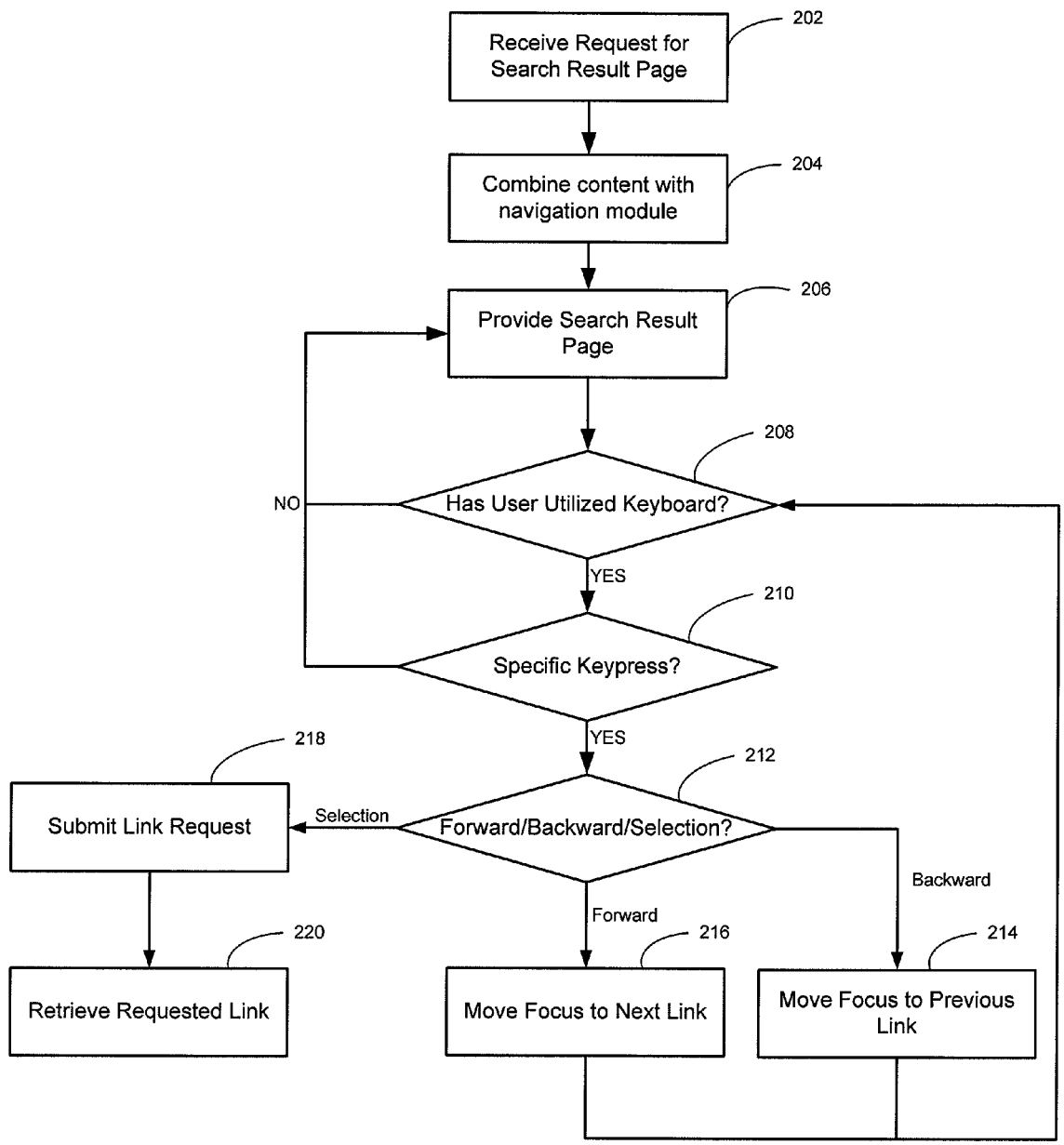
FIG. 2 presents a flow diagram illustrating a method for keyboard navigation of a content item according to one embodiment of the present invention.

A requesting client device 106 and 108 receives the content item that comprises the navigation module 120 from the content provider 104. When the client device 106 and 108 receives the content item, the given client device attempts to render the viewable portions of the content item to a display device and execute any program code contained in the content item. Program code in the navigation module 120 that the content provider 104 transmits to the client device 106 and 108 is operative to trap for, listen for or otherwise intercept specific enumerated key presses by the user. When the user selects a specific key for which the navigation module 120 is listening, the navigation module 120 determines a navigation action to take in response to the key press by the user. Accordingly, FIG. 2 presents a method for keyboard navigation of a content item. Although the embodiment that FIG. 2 illustrates describes operation in the context of a search engine and search results page, the method is applicable to content items generally, e.g., web pages. According to the embodiment in FIG. 2, a request for a search result page is received, step 202. In accordance with one embodiment, a request for a search result page is in response to a user submitting a search query to an Internet search engine, such as Yahoo! Search. A user may enter a search query into a provided resource, such as an HTML textbox element present on a web page that provides an interface to the search engine.

After a request for a search result page is received, search result content (or other page content) is combined with a navigation module, step 204, which according to one embodiment comprises program code to allow for the custom navigation of a content item through the use of a keyboard. When a user requests a search result page, the search engine may retrieve the search results from an internal or external database, as known in the art. Similarly, the search engine may dynamically generate the search result page from information in combinations of internal and external databases. The search engine may additionally combine a navigation module as part of the retrieved results for presentation to the user as a search result page.

In accordance with one embodiment, the navigation module comprises JavaScript program code appended or linked to an HTML webpage comprising the requested search results. For example, a user may request the search results for a particular term. In response to retrieving the search results from a index or other database, a server may attach JavaScript program code to the search results. The JavaScript program attached to the search results may comprise one or more functions and statements that allow a programmatically defined function to attach to an event handler such as "onkeypress", "onkeydown" or other event handlers known in the art. A search result page is provided in response to the user request, step 206. As previously described, in one embodiment a content item such as a search result page may comprise HTML markup code comprising one or more hyperlinks and other content.

After the content server, such as a search engine, provides a search result page to a user device, step 206, program code in the navigation module monitors for trapped keyboard information, step 208, for example, monitoring for the depression of the arrow keys. If the user does not utilize the keyboard or otherwise interact with the content item, the search result page remains displayed on the user device, step 206.

If a user utilizes the keyboard, step 208, a check may be made as to the specific key that the user presses, step 210. When a user utilizes a keyboard device, he or she may depress a plurality of keys. Embodiments of the present invention ascertain the specific one or more keys have that the user presses and compares said key presses to an enumerated list of key press action associations. Alternatively, or in conjunction with the foregoing, a key press event may be handled by a defined event handler, which may be written in a language such as JavaScript. According to one embodiment, the JavaScript program comprises a switch statement that is keyed to switch on the value of the user key press and perform one or more appropriate actions.

As indicated above, the method makes a determination as to a specific key that the user presses, step 210. After the determination has been made that one or more of a specific subset of keys has been pressed, a second determination is made that the user presses a key out of the subset of keys that the navigation module is monitoring, step 212. In accordance with one embodiment, the navigation module uses a second switch statement to switch based on the subset of keys. Alternatively, steps 210 and 212 may be combined as one decision block.

Steps 214, 216, 218 and 220 illustrate one specific embodiment of monitoring for specific key presses and subsequent actions taken in response to received of a specific key press. Although only three key presses are illustrated as being monitored or otherwise trapped, those of skill in the art should recognize the existence of alternative embodiments wherein additional key presses are detected or key presses are mapped to different actions.

If a backward action is selected, e.g., left arrow, focus may be moved to a previous link within a given content item, step 214, e.g., moving focus to a hyperlink for a previous result displayed on a search result page. In one embodiment, a key press associated with the depression of the back arrow key may be bound to the action of moving focus to a previous link within a given content item. For example, an event handler may receive a value of "keycode=37" corresponding to the depression of a back arrow. Program code at the navigation module may detect this value and appropriately move the focus back to the previous link displayed on a search result page.

The movement of focus may be implemented in a plurality of ways. For example, JavaScript program code may maintain an identification of a hyperlink with which the user most recently interacted. That is, event handlers may be attached to each hyperlink that informs the JavaScript program that a link has been interacted with, e.g., a mouse over event. The JavaScript program may contain a reference variable to the currently active link that stores an identifier of the link in memory. Upon the depression of a movement command, such as a backward movement action, the JavaScript program code executing at the client may search for the currently active link in a structure containing a list of links on a search page. For example, one structure that stores links may be the "document.links" array present in JavaScript. Alternatively, a custom structure containing the links of a webpage may be utilized. For example, a JavaScript program may utilize the "document.getElementsByTagName" available through the JavaScript API to fetch the links present on a page. This method would allow a JavaScript program to define an array containing custom parameters, specific to the present invention's needs. Similarly, a generic event handler may monitor and record user interaction with hyperlinks in a given content item, such as defining a "mouse over" event handler to collect link information when the user hovers the mouse over a given link.

Returning to step 214, if a forward action is selected, focus may be moved to a next link, step 216. In accordance with one embodiment, a key press associated with the depression of the forward arrow may be bound to the action of moving focus to a next link. For example, an event handler may receive a value of "keycode=39" corresponding to the depression of a forward arrow. Program code at the navigation module may detect this value and appropriately move the page focus to the next link.

A third action may be defined wherein, when a user selects a link, a link request is submitted, step 218. The action triggering the submission of a link request may be a plurality of actions including, but not limited to, the depression of the "Enter" key, the depression of the spacebar, or any other key available for binding to the selection action. Subsequently, a page associated with the link is retrieved, step 220.

Figure 3:
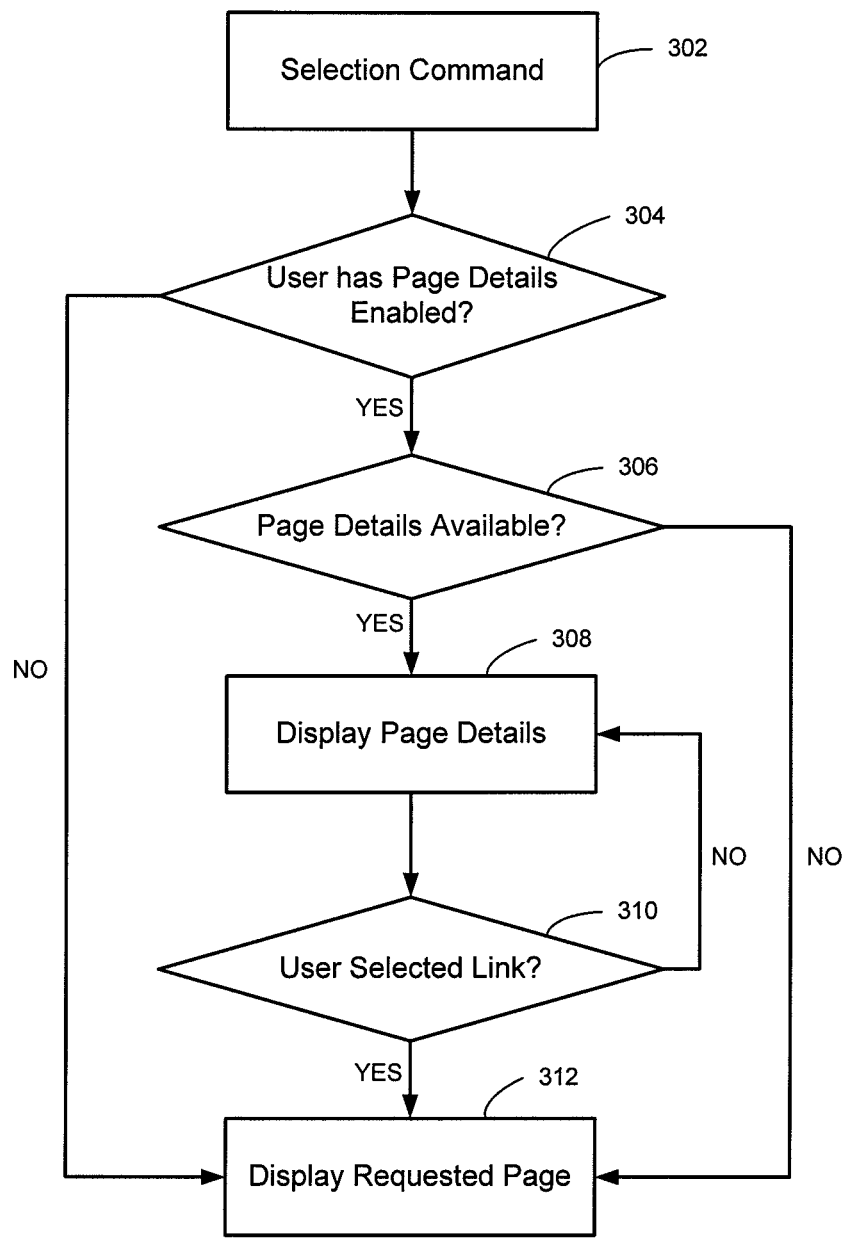
FIG. 3 presents a flow diagram illustrating a method for display of additional hyperlink details in response to user selection of a link to a given content item according to one embodiment of the present invention.

FIG. 3 illustrates one embodiment of a method for displaying additional hyperlink details in response to a user selection of a given hyperlink. As FIG. 3 illustrates, a content server such as a search engine receives a selection command from a user indicating selection of a given hyperlink, step 302. According to various embodiments of the invention, a selection may include, but is not limited to, a mouse click, a mouse over or a key press. In an alternative embodiment, multiple selection commands may be monitored and utilized to generate a selection command. For example, a user mouse over and a user key press may both trigger a selection command depending on which is utilized.

When a user issues or otherwise performs a selection operation, a check is made to determine whether a user has the display of extra page details available, step 304. According to one embodiment, a user may select whether or not he or she wishes to view additional page details before navigating to a particular page. This information may be stored within a user profile, which according to one embodiment is maintained by a web server utilized by the server providing the page containing the hyperlinks. Alternatively, this information may be stored in a cookie on the user device. If the user selects not to view additional page details, the requested page is simply retrieved for display, step 312.

If a user enables the display of additional page details, the method performs a check to determine if additional page details for the requested page exist, step 306. If the page details exist, the page details are displayed to a user, step 308. If not, the requested page is displayed, step 312. In accordance with one embodiment of the invention, additional page details may include metadata associated with the page the user is requesting including, but not limited to, page title, page description, page author(s), etc. Metadata may be extracted from the requested page itself. For example, an asynchronous request may fetch page details in the background of the search results page and retrieve data located in META tags of the returned content item. Alternative embodiments may exist wherein metadata a plurality of different mechanisms gather metadata, such as parsing the requested page and extracting the frequently occurring content, similar to that of a search engine web crawler, e.g., page analytics or metrics.

Alternatively, or in conjunction with the foregoing, a page preview may be displayed upon the user selection of a hyperlink. For example, when a user selects a hyperlink, a small preview (such as a thumbnail image) may be generated providing the user an opportunity to preview the page prior to navigating to the page. Alternatively, a larger preview may be displayed, such as by dimming the search result page and overlaying a preview of the requested page.

After displaying the additional page details, the page containing the hyperlinks remains displayed until a user selects to navigate to the link he or she is requesting, step 310. Upon the selection of a link, the requested page is displayed, step 312.

Figure 4:
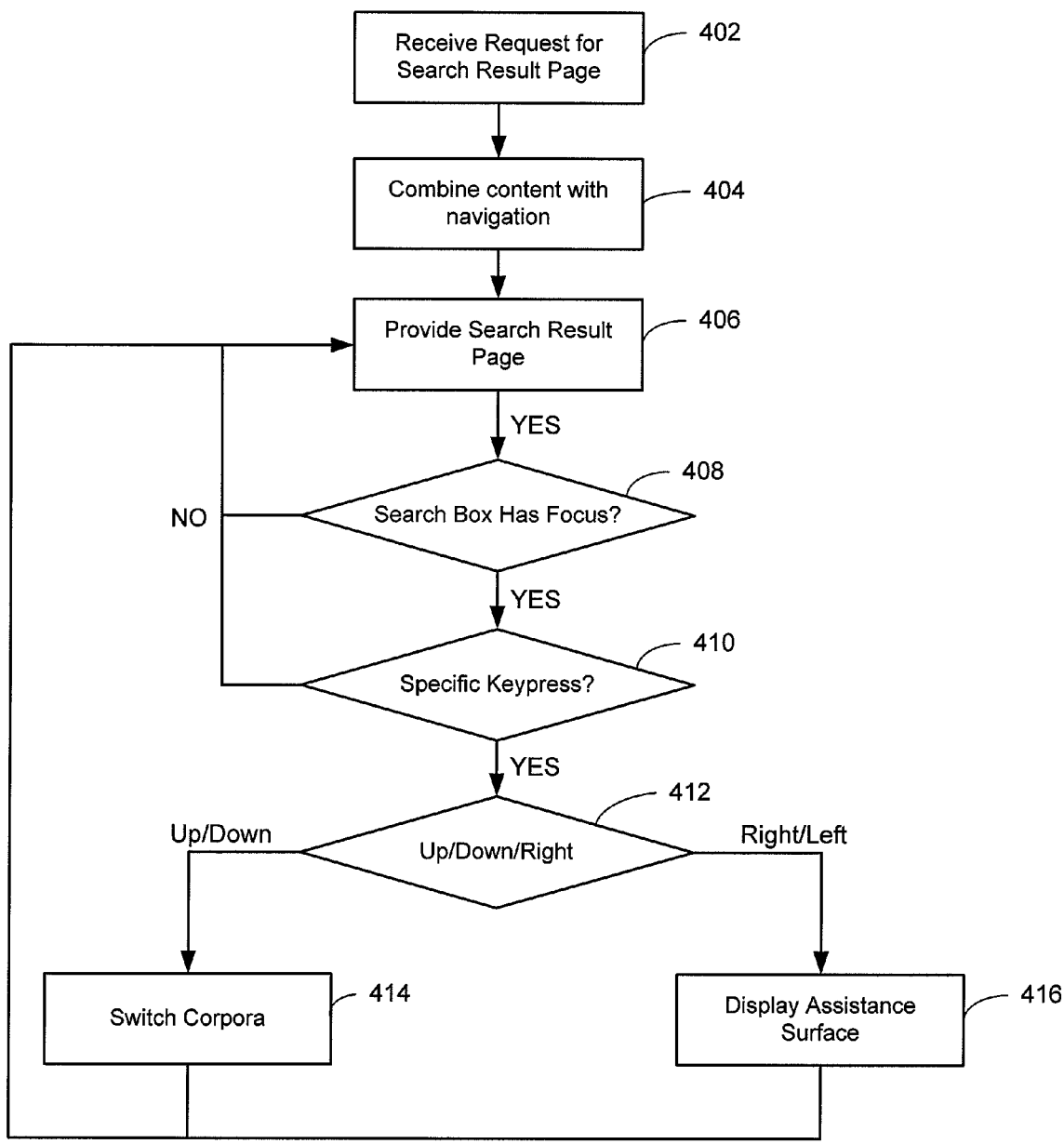
FIG. 4 presents a flow diagram illustrating method for keyboard navigation within a search box of a search results page according to one embodiment of the present invention.

FIG. 4 presents a method for keyboard navigation within a search box of a search results page, although those of skill in the art recognize that other user interface components may implement navigation functionality in a similar manner. According to the embodiment in FIG. 4, a content server, such as a search engine, receives a request for a content item, e.g., a search result page, step 402. In accordance with one embodiment, a request for a search result page may be the result of a user submitting a search query to an Internet search engine, such as Yahoo! Search. A user may enter a search query into a provided resource or other user interface component, such as an HTML textbox element present on a web page.

After receiving a request for a search result page, a search result set that is responsive to the search request is combined with a navigation module, step 404. When a user requests a search result page, links to content items that are responsive to the search request may be retrieved from various combinations of internal and external databases, as is known to those of skill in the art. Along with the retrieved search results, a navigation module may be combined with the retrieved results and presented to the user as a search result page. In accordance with one embodiment, the navigation module may comprise JavaScript program appended to an HTML webpage comprising results that are responsive to the search request that the user provides. For example, a user may request the search results for a particular term. In response to identifying the results that are responsive to the search request from an index data store, a server may attach JavaScript program code to the search results. The JavaScript program code attached to the search results may comprise one or more of functions and statements that allow a programmatically defined function to attach to an event handler such as "onkeypress", "onkeydown" or other event handlers known to those of skill in the art.

A search result page is provided in response to the user request, step 406. As previously described, in accordance with one embodiment the search result page may comprise an HTML page containing one or more hyperlinks in addition to other content.

After the search result page is provided to a user device, step 406, program code (such as the navigation module) at the search results page determines if a search box has focus, step 408. In accordance with one embodiment, a search box present on a search results page may be configured to call the navigation program upon receiving focus from a user. For example, an HTML INPUT element may attach a JavaScript function to the focus event through the use of the "on Focus" event. If the search box does not receive focus from the user, the search results pages remains as previously presented, step 406.

If a user utilizes the keyboard, a check is made as to the specific key the user has pressed, step 410. When a user utilizes a keyboard device, he or she may depress one or more keys. Accordingly, the present embodiment of the invention determines the one or more keys that the user presses to determine if an action is to be taken. For example, the one or more keys that the user presses may be compared to a list of key press action associations. In accordance with one embodiment, a key press event may be handled by a specific event handler in a language such as JavaScript. The JavaScript program code may comprise a switch statement or other programmatic logic that switches on the value of the key pressed to perform an appropriate action.

If a specific key press is detected, an appropriate action must be taken according to the exact key that the user presses, step 412. As stated previously, according to one embodiment a switch statement may be utilized to perform actions based on the exact key pressed. Steps 414-416 illustrate two possible embodiments of keys that may be pressed, as well as two possible actions corresponding to those key presses. It should be noted that steps 414 and 416 illustrate one embodiment of a plurality of possible embodiments falling within the scope and spirit of the invention.

As FIG. 4 illustrates, where a user presses the up or down keys, the search engine may switch the search corpora, step 414. For example, a user may enter an initial search for a used automobile and search for the term using a global search engine such as the search engine present on the Yahoo! portal. Upon receiving the search results corresponding to the search term, the user may decide that the results are not related to the goals he or she had in mind before performing the search. For example, a search for a "1970 Dodge Challenger R/T" using a global search engine may result in a plurality of webpages unrelated to the purchase of such an automobile, such as owner's personal pages. Thus, a user may want to switch the corpus to an auto specific vertical, for example, the search may be run using a shopping corpus that contains only items available for purchase.

In accordance with one embodiment, the new search results resulting from a corpus change are retrieved and displayed without a page re-load. Such an action may be performed via an asynchronous call to the new corpus database. The asynchronous call may fetch the search results and return the data to the JavaScript program code resident on the search results page and executing on the client device. The JavaScript program may, in turn, parse the search results and replace the existing results with the results from the new corpus. Alternatively, the depression of the up and down keys may provide the user with a dialog providing a second selection corresponding to the corpus that is able to be selected. This would allow the user to navigate through a list of corpora for selection of the most relevant from the list.

A second action that may be monitored is the depression of the left or right keys. If a user depresses the left or right keys while the search box maintains focus, an assistance surface may be displayed, step 416. In accordance with one embodiment, an assistance surface may comprise helpful information related to the query entered into the search box by the user. For example, an assistance panel may comprise a plurality of related searches archived by the search engine. The search engine or other content server may generate the assistance surface in accordance with systems and methods described in co-owned U.S. patent application Ser. No. 11/755,851, entitled "SYSTEM AND METHOD FOR PROVIDING VECTOR TERMS RELATED TO A SEARCH QUERY," filed on May 31, 2007, the disclosure of which is hereby incorporated by reference herein in its entirety.

FIGS. 1 through 4 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A method of facilitating search based on keyboard interactions, the method being implemented on a machine having at least one processor, storage, and communication platform, the method comprising:
   receiving, from a user, a search request that specifies at least one search term;
   obtaining, from a first source having a first set of content items, one or more first content items relating to the at least one search term;
   providing, to the user, one or more first search results that includes the one or more first content items;
   determining a first press from the user of a first key;
   obtaining, from a second source having a second set of content items, one or more second content items relating to the at least one search term in response to the first press of the first key;
   providing, to the user, one or more second search results that includes the one or more second content items;
   determining a second press from the user of the first key;
   obtaining, from a third source having a third set of content items, one or more third content items relating to the at least one search term in response to the second press of the first key; and
   providing, to the user, one or more third search results that includes the one or more third content items.

2. The method of claim 1, wherein the first source includes a first database, the second source includes a second database, and the third source includes a third database, and wherein the one or more first content items are obtained based on a search of the first database, the one or more second content items are obtained based on a search of the second database, and the one or more third content items are obtained based on a search of the third database.

3. The method of claim 1, wherein the user performed the first press of the first key while viewing the one or more first search results.

4. The method of claim 1, wherein providing the one or more first search results comprises providing the one or more first search results on a web page, and wherein providing the one or more second search results comprises replacing the one or more first search results with the one or more second search results on the web page without reloading the web page.

5. The method of claim 1, wherein a press of the first key is a single key press.

6. The method of claim 1, further comprising:
   determining a press from the user of a second key, wherein the user performed the press of the second key while viewing the one or more third search results;
   obtaining, from the second source, one or more fourth content items relating to the at least one search term in response to the press of the second key; and
   providing, to the user, one or more fourth search results that include the one or more fourth content items.

7. Non-transitory computer readable media comprising program code for execution by a programmable processor that instructs the processor to perform a method for facilitating search based on keyboard interactions, the computer readable media comprising:
   program code for receiving, from a user, a search request that specifies at least one search term;
   program code for obtaining, from a first source having a first set of content items, one or more first content items relating to the at least one search term;
   program code for providing, to the user, one or more first search results that includes the one or more first content items;
   program code for determining a first press from the user of a first key;
   program code for obtaining, from a second source having a second set of content items, one or more second content items relating to the at least one search term in response to the first press of the first key;
   program code for providing, to the user, one or more second search results that includes the one or more second content items;
   program code for determining a second press from the user of the first key;
   program code for obtaining, from a third source having a third set of content items, one or more third content items relating to the at least one search term in response to the second press of the first key; and
   program code for providing, to the user, one or more third search results that includes the one or more third content items.

8. The computer readable media of claim 7, wherein the first source includes a first database, the second source includes a second database, and the third source includes a third database, and wherein the one or more first content items are obtained based on a search of the first database, the one or more second content items are obtained based on a search of the second database, and the one or more third content items are obtained based on a search of the third database.

9. The computer readable media of claim 7, wherein the user performed the first press of the first key while viewing the one or more first search results.

10. The computer readable media of claim 7, wherein providing the one or more first search results comprises providing the one or more first search results on a web page, and wherein providing the one or more second search results comprises replacing the one or more first search results with the one or more second search results on the web page without reloading the web page.

11. The computer readable media of claim 7, wherein a press of the first key is a single key press.

12. The computer readable media of claim 7, further comprising:
   program code for determining a press from the user of a second key, wherein the user performed the press of the second key while viewing the one or more third search results;
   program code for obtaining, from the second source, one or more fourth content items relating to the at least one search term in response to the press of the second key; and
   program code for providing, to the user, one or more fourth search results that include the one or more fourth content items.

13. A system for facilitating search based on keyboard interactions, the system comprising:
   a server communicatively coupled to one or more client devices, the server comprising at least one processor programmed to execute one or more computer program instructions which, when executed, cause the server to:
      receive, from a user, a search request that specifies at least one search term;

obtain, from a first source having a first set of content items, one or more first content items relating to the at least one search term;

provide, to the user, one or more first search results that includes the one or more first content items;

determine a first press from the user of a first key;

obtain, from a second source having a second set of content items, one or more second content items relating to the at least one search term in response to the first press of the first key;

provide, to the user, one or more second search results that includes the one or more second content items;

determine a second press from the user of the first key;

obtain, from a third source having a third set of content items, one or more third content items relating to the at least one search term in response to the second press of the first key; and provide, to the user, one or more third search results that includes the one or more third content items.

14. The system of claim 13, wherein the first source includes a first database, the second source includes a second database, and the third source includes a third database, and wherein the one or more first content items are obtained based on a search of the first database, the one or more second content items are obtained based on a search of the second database, and the one or more third content items are obtained based on a search of the third database.

15. The system of claim 13, wherein the user performed the first press of the first key while viewing the one or more first search results.

16. The system of claim 13, wherein providing the one or more first search results comprises providing the one or more first search results on a web page, and wherein providing the one or more second search results comprises replacing the one or more first search results with the one or more second search results on the web page without reloading the web page.

17. The system of claim 13, wherein the server is further caused to:

determine a press from the user of a second key, wherein the user performed the press of the second key while viewing the one or more third search results;

obtain, from the second source, one or more fourth content items relating to the at least one search term in response to the press of the second key; and provide, to the user, one or more fourth search results that include the one or more fourth content items.

* * * * *